US009689515B2

(12) United States Patent
Seong et al.

(10) Patent No.: US 9,689,515 B2
(45) Date of Patent: Jun. 27, 2017

(54) QUICK CONNECTOR APPARATUS

(71) Applicants: Gi Jin Seong, Ulsan (KR); Hyeong Ju Park, Ulsan (KR)

(72) Inventors: Gi Jin Seong, Ulsan (KR); Hyeong Ju Park, Ulsan (KR)

(73) Assignee: NIFCO KOREA INC., Asan (KR)

( * ) Notice: Subject to any disclaimer, the term of this patent is extended or adjusted under 35 U.S.C. 154(b) by 70 days.

(21) Appl. No.: 14/772,774

(22) PCT Filed: Nov. 6, 2013

(86) PCT No.: PCT/KR2013/010002
§ 371 (c)(1),
(2) Date: Sep. 3, 2015

(87) PCT Pub. No.: WO2015/068867
PCT Pub. Date: May 14, 2015

(65) Prior Publication Data
US 2016/0018035 A1    Jan. 21, 2016

(51) Int. Cl.
| | |
|---|---|
| *F16L 37/086* | (2006.01) |
| *F16L 25/06* | (2006.01) |
| *F02M 59/44* | (2006.01) |
| *F02M 59/10* | (2006.01) |
| *F16L 37/10* | (2006.01) |
| *F16L 37/133* | (2006.01) |

(52) U.S. Cl.
CPC .......... *F16L 25/06* (2013.01); *F02M 59/102* (2013.01); *F02M 59/44* (2013.01); *F16L 37/086* (2013.01); *F16L 37/10* (2013.01); *F16L 37/133* (2013.01)

(58) Field of Classification Search
CPC ...... F16L 37/10; F16L 37/086; F16L 37/0982
USPC .......................... 285/87, 319, 305; 439/312
See application file for complete search history.

(56) References Cited

U.S. PATENT DOCUMENTS 6,892,706 B2 *  5/2005  Kienzler .............. F02M 55/004
                                                        123/456
8,205,912 B2 *  6/2012  Takenaka ............ F16L 37/0985
                                                         285/319
(Continued)

FOREIGN PATENT DOCUMENTS

JP        2007-132448 A     5/2007
KR    10-2003-0067727 A     8/2003
(Continued)

*Primary Examiner* — David E Bochna
(74) *Attorney, Agent, or Firm* — Patent Office of Dr. Chung Park

(57) ABSTRACT

A quick connector device includes: a connector body that has two fluid hose connectors located at two ends and an injector port connector located at a middle bottom section thereof; a locking member that is inserted into and rotatably connected to the injector port connector of the connector body and detachably coupled to the injector port; and an o-ring that is coupled to the injector port connector of the connector body and provides a sealing to the injector port. The connector body includes a support rib and a receiving space that securely maintain the locked state and allow the technician to easily assemble/disassemble the device. The quick connector device allows the technician to determine whether the device is in the locked or unlocked state based on the angular position of the locking member.

2 Claims, 4 Drawing Sheets

(56) References Cited

U.S. PATENT DOCUMENTS

| | | | | |
|---|---|---|---|---|
| 8,267,431 | B2* | 9/2012 | Okuno | F16L 37/138 285/314 |
| 8,336,924 | B2* | 12/2012 | Ully | F16L 37/098 285/319 |
| 8,690,199 | B2* | 4/2014 | Pernikl | F16L 37/098 285/319 |
| 8,708,375 | B2* | 4/2014 | Knis | F16L 37/098 285/319 |
| 2008/0252071 | A1* | 10/2008 | Lechner | F16L 37/098 285/319 |
| 2012/0001415 | A1 | 1/2012 | Hensel et al. | |
| 2012/0256414 | A1* | 10/2012 | Ully | F16L 37/098 285/319 |
| 2016/0018035 | A1* | 1/2016 | Seong | F16L 37/086 285/34 |

FOREIGN PATENT DOCUMENTS

| KR | 10-2009-0117661 A | 11/2009 |
|---|---|---|
| KR | 10-2012-0001362 A | 1/2012 |
| KR | 10-1327682 B1 | 11/2013 |

* cited by examiner

QUICK CONNECTOR APPARATUS

CROSS-REFERENCE TO PRIOR APPLICATIONS

This application is a national Stage Patent Application of PCT International Patent Application No. PCT/KR2013/010002, filed on Nov. 6, 2013 under 35 U.S.C. §371, which is all hereby incorporated by reference in its entirety.

TECHNICAL FIELD

The present invention relates to a quick connector device for connecting a return hose to fluid transfer passageway, and more particularly to a device having a locking member that a user can easily unlock and disconnect from an injector port by turning the locking member, to thereby allow the user to assemble and repair the device in a convenient manner.

BACKGROUND TECHNIQUE

In general, an automobile engine has an injector that injects fuel and returns remaining portion of the fuel back to the fuel tank. Also, a connector is used to couple a return hose to the injector port.

The quick connector device is coupled to both the return hose and injector port. The remaining fuel is returned to the fuel tank through the return hose.

The quick connector device includes a connector body that has a T-shape, where the connector body has two fluid hose connectors located at two ends and an injector port connector located at the middle bottom section. A locking member is coupled to the injector port connector of the connector body.

FIG. 1 shows a perspective view of one conventional quick connector device and FIG. 2 shows a perspective view of another conventional quick connector device.

In the conventional devices, as depicted in FIGS. 1 and 2, the locking member (120) (220) is pushed toward the connector body (110) (210) so that the injector port is coupled to the injector port connector (111) (211) of the connector body (110) (210).

In the case of the quick connector device (100) in FIG. 1, to couple the injector port connector (111) to the injector port, the injector port connector (111) of the connector body (100) should be inserted into the injector port before the locking member (120) is pushed. However, an inexperienced person may not follow the proper assembly procedures. Also, when repairing the quick connector device (100), a linear action may impose a stress on the portion where the locking member (120) engages the injector port, causing damage to the engaging portion of the locking member (120) and making it a hard task to disassemble the quick connector device (100).

In the case of quick connector device (100) in FIG. 2, the injector port connector (121) of the connector body (210) should be inserted into the injector port before the locking member (220) is pushed to be coupled to the connector body. Thus, it is not easy to determine whether the locking member (220) is locked to the injector port or not. Also, a technician may easily break the locking member (220) and injector port during the assembly process. In addition, the portion of the locking member (220) that engages the injector port has a shape of a simple bump, making it a hard task to dissemble the quick connector device for repair.

SUMMARY OF THE INVENTION

Technical Problem

The present invention is derived to resolve the problems of the prior art as discussed above and has an object to provide a quick connection device that allows the injector port connector and the locking member to be securely coupled to the injector port of the connector body. Also, the technician can easily disconnect the locking member and the injector port connector of the connector body from the injector port during the disassembly and repair.

Another object of the present invention is to prevent damage to the components of the quick connector device during connection to or disconnection from the injector port.

The Task Solution Means

In order to achieve the above and any other objects of the present invention, according to one aspect of the present invention there is provided a quick connector device comprising: a connector body that has two fluid hose connectors located at two ends and an injector port connector located at the middle bottom section thereof; a locking member that is inserted into and rotatably connected to the injector port connector of the connector body and detachably coupled to the injector port; and an o-ring that is coupled to the injector port connector of the connector body and provides a sealing to the injector port.

One embodiment of the quick connector device of the present invention includes at least one elastic member that is located on outer side of the locking member and has cut-out ends, a bump that engages into a bump receiving space formed on the inner surface of the injector port and is disposed on outer side of the elastic member, a receiving space that is formed on an upper outer surface of the injector port connector of the connector body and allows elastic member to move inwardly therein, and a support rib that is disposed on one side of the receiving space and prevents the elastic member from moving when the locking member is locked.

In the quick connector device of the present invention, the locking member includes a handle that is disposed on the upper side of the locking member and forms an integral portion of the locking member, and the handle includes rib receiving grooves formed on an upper middle sides and upper middle front and back portions thereof. The injector port connector of the connector body includes catch ribs that are disposed on upper sides thereof along a horizontal direction and engage into the rib receiving grooves.

The quick connector device of the present invention includes second bump receiving spaces that are disposed along the vertical direction at front and back sides of the locking member and disposed on an inner surface of the locking member, and second bumps that are disposed on upper outer surface of the injector port connector of the connector body and disposed at left, right, front, and back sides of the injector port connector and correspond to the second bump receiving spaces.

Effect of Invention

The quick connection device of the present invention in view of the task solution means is advantageous in that the support rib prevents the elastic member of the locking member from elastically deforming during the lock state to thereby maintain a secure lock state, the receiving space of the connector body allows the elastic member of the locking member to elastically deform so that the locking member and the connector body can be easily disconnected from the injector port during disassemble and repair, and the damage to the components of the quick connector device during assembly and disassembly processes can be prevented.

Also, in the quick connection device of the present invention, the locking member is rotated to enter into the unlock state. Thus, by checking the rotation of the locking member, the user can easily determine whether the locking member is in the lock state or unlock state.

BEST MODE FOR CARRYING OUT INVENTION

Hereinafter, preferred embodiments of the present invention will be described in detail with reference to the accompanying drawings.

Figure 1:
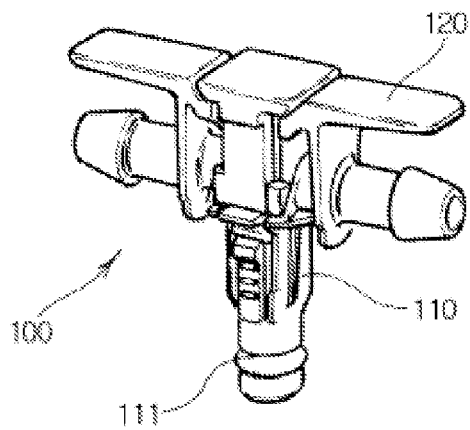
FIG. 1 shows a perspective view of a conventional quick connector device.
Figure 2:
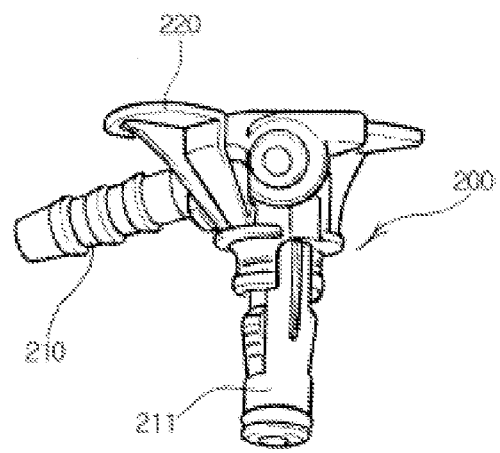
FIG. 2 shows a perspective view of another conventional quick connector device.
Figure 3:
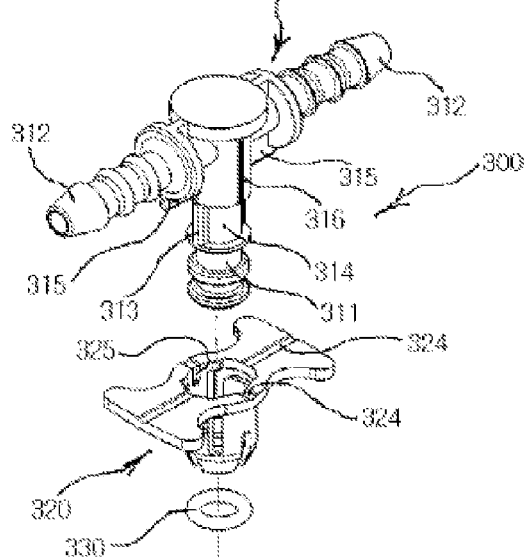
FIG. 3 shows an exploded view of a quick connector device according to one embodiment of the present invention.
Figure 4A:
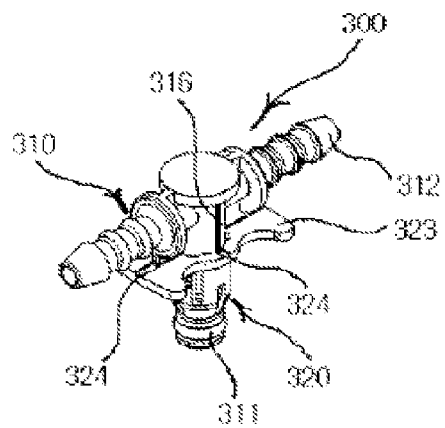
FIG. 4a shows a perspective view of the quick connector device in FIG. 3, where the quick connector device is in the locked state.
Figure 4B:
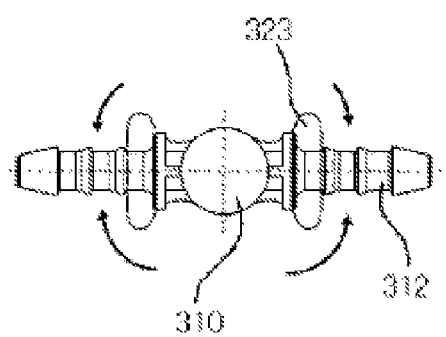
FIG. 4b shows a plan view of the quick connector device in FIG. 3, where the quick connector device is in the locked state.
Figure 4C:
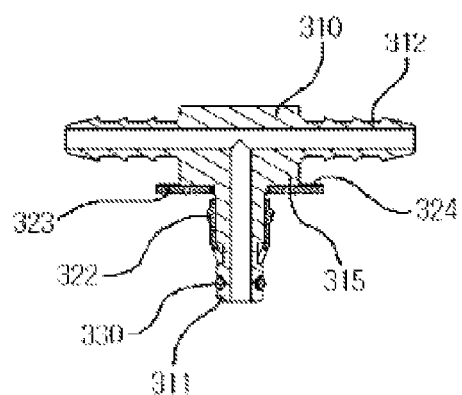
FIG. 4c shows a cross sectional view of the quick connector device in FIG. 3, where the quick connector device is in the locked state.
Figure 5A:
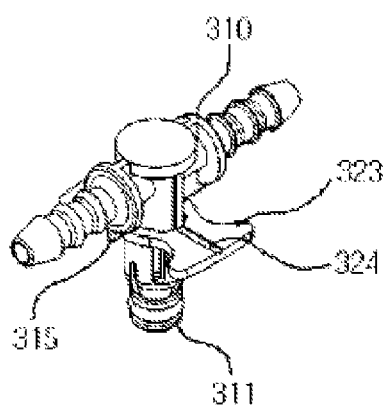
FIG. 5a shows a perspective view of the quick connector device in FIG. 3, where the quick connector device is in the unlocked state.
Figure 5B:
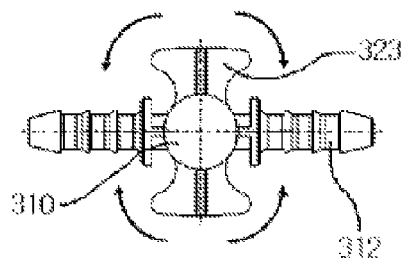
FIG. 5b shows a plan view of the quick connector device in FIG. 3, where the quick connector device is in the unlocked state.
Figure 5C:
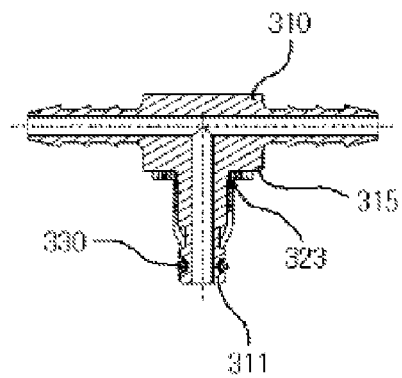
FIG. 5c shows a cross sectional view of the quick connector device in FIG. 3, where the quick connector device is in the unlocked state.

FIG. 3 shows an exploded view of a quick connector device according to one embodiment of the present invention. FIGS. 4a, 4b, and 4c show a perspective view, a plan view, and a cross sectional view of the quick connector device in FIG. 3, respectively, where the quick connector device is in the locked state. FIGS. 5a, 5b, and 5c show a perspective view, a plan view, and a cross sectional view of the quick connector device in FIG. 3, respectively, where the quick connector device is in the unlocked state.

Figure 6:
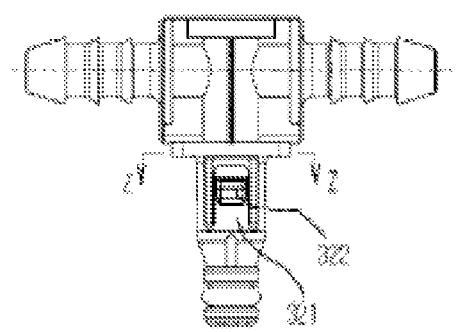
FIG. 6 shows a front view of the quick connector device in FIG. 3, where the quick connector device is in the unlocked state.

FIG. 6 shows a front view of the quick connector device in FIG. 3, where the quick connector device is in the unlocked state.

As depicted in FIGS. 3-6, the quick connector device (300) of the present invention comprises:

a connector body (310) that has two fluid hose connectors (312) located at two ends and an injector port connector (311) located at the middle bottom section thereof;

a locking member (320) that is inserted into and rotatably connected to the injector port connector (311) of the connector body (310) and detachably coupled to the injector port (400);

an o-ring (330) that is coupled to the injector port connector (311) of the connector body (310) and provides a sealing to the injector port (400).

The quick connector device (300) of the present invention includes at least one elastic member (321) that is located on outer side of the locking member (320) and has cut-out ends, a bump (322) that engages into a bump receiving space (402) formed on the inner surface of the injector port (400) and is disposed on outer side of the elastic member (321).

The quick connector device (300) of the present invention includes a receiving space (314) that is formed on an upper outer surface of the injector port connector (311) of the connector body (310) and allows the elastic member (321) to elastically deform therein, and a support rib (313) that is disposed on one side of the receiving space (314) and prevents the elastic member (321) from moving when the locking member (320) is locked.

As such, in the quick connector device (300) of the present invention, the elastic member (321) of the locking member (320) is elastically and inwardly deformed only when the elastic member (321) engages into the receiving space (314) so that the connector body (310) and the locking member (320) can be disconnected from the injector port (400).

Figure 7A:
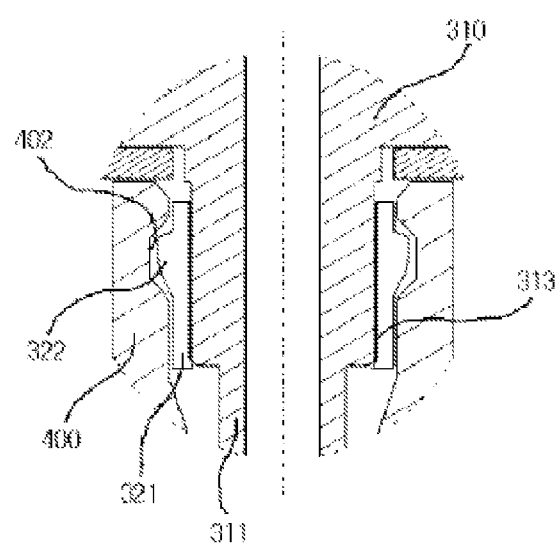
FIG. 7a shows a cross sectional view of a portion of the quick connector device in FIG. 3, where the quick connector device is in the locked state.
Figure 7B:
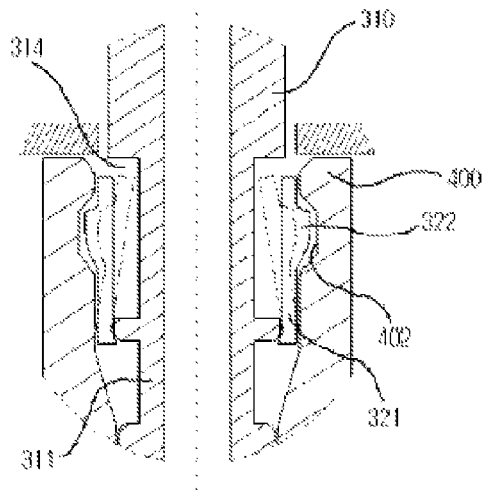
FIG. 7b shows a cross sectional view of a portion of the quick connector device in FIG. 3, where the quick connector device is in the unlocked state.

FIG. 7a shows a cross sectional view of a portion of the quick connector device in FIG. 3, where the quick connector device is in the locked state. FIG. 7b shows a cross sectional view of a portion of the quick connector device in FIG. 3, where the quick connector device is in the unlocked state.

As depicted in FIG. 7a, when the quick connector device (300) of the present invention is in the locked state, the support rib (313) of the connector body (310) contacts the inner surface of the elastic member (321) of the locking member (320), and the bump (322) formed on the outer side of the elastic member (321) does not escape the bump receiving space (402). This feature allows the locking member (320) and the connector body (310) are securely locked to the injector port (400).

When the locking member (320) is rotated by 90 degrees from the locked state, as depicted in FIG. 7b, so that the elastic member (321) is aligned with the receiving space (314) of the connector body (310), the elastic member (321) of the locking member (320) elastically deforms toward the receiving space (314) to thereby put the device into the unlocked state. In the unlocked state, the locking member (320) and the connector body (310) can be separated from the injector port (400).

Figure 8:
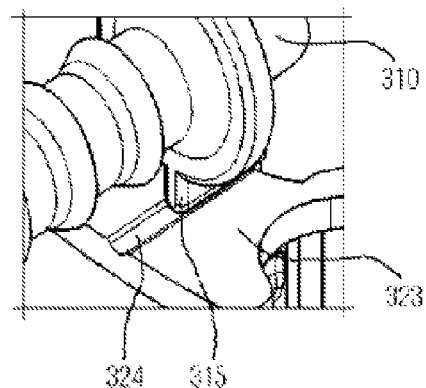
FIG. 8 shows a perspective view of a portion of the quick connector device in FIG. 3, where the quick connector device is in the locked state.
Figure 9:
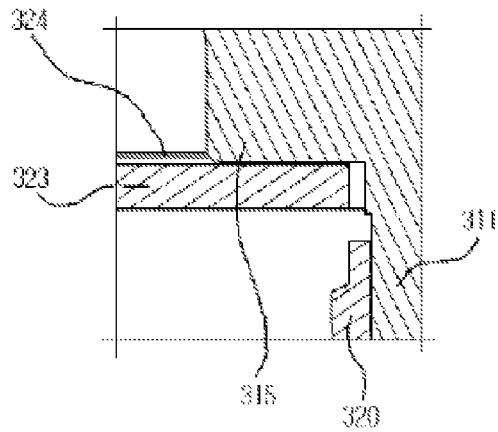
FIG. 9 shows a cross sectional view of the portion of the quick connector device in FIG. 8.

FIG. 8 shows a perspective view of a portion of the quick connector device in FIG. 3, where the quick connector device is in the locked state. FIG. 9 shows a cross sectional view of the portion of the quick connector device in FIG. 8.

As depicted in FIGS. 3, 8 and 9, in the quick connector device (300), the locking member (320) includes a handle (323) that is disposed on the upper side of the locking member and forms an integral portion of the locking member (320), and the handle (323) includes rib receiving grooves (324) formed on an upper middle sides and upper middle front and back portions thereof.

The injector port connector (311) of the connector body (310) includes catch ribs (315) that are disposed on upper sides thereof along a horizontal direction and engage into the rib receiving grooves (324).

As such, in the locked state, the catch ribs (315) of the connector body (310) engage into the rib receiving grooves (324) of the locking member (320) so that the device may securely remain in the locked state. Also, when the locking member (320) is rotated by 90 degrees, the catch ribs (315) engage into the rib receiving grooves (324) that are located in the upper middle front and back sides of the locking member (320) so that the device may securely remain in the unlocked state. While switching between the locked and unlocked states, the catch ribs (315) of the connector body (310) engage into and disengage from the rib receiving grooves (324) of the locking member (320), to allow the technician to feel how the device works.

Figure 10:
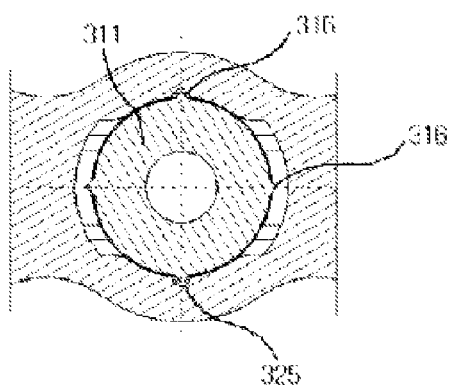
FIG. 10 shows a cross sectional view of the quick connector device in FIG. 6, taken along the line z-z.

FIG. 10 shows a cross sectional view of the quick connector device in FIG. 6, taken along the line z-z.

As depicted in FIGS. 3, 6, and 10, the quick connector device (300) of the present invention includes second bump receiving spaces (325) that are disposed along the vertical direction at front and back sides of the locking member (320) and disposed on an inner surface of the locking member (320), and second bumps (316) that are disposed on upper outer surface of the injector port connector (311) of the connector body (310) and disposed at left, right, front, and back sides of the injector port connector (311) and correspond to the second bump receiving spaces (325).

As such, in the locked state, the second bumps (316) that are located on left and right sides of the injector port connector (311) of the connector body (310) engage into the second bump receiving spaces (325) of the locking member (320). Also, in the unlocked state, the second bumps (316) that are located on front and back sides of the injector port connector (311) of the connector body (310) engage into the second bump receiving spaces (325) of the locking member (320). While switching between the locked and unlocked states, the second bumps (316) of the connector body (310) engage into and disengage from the second bump receiving spaces (325) of the locking member (320), to allow the technician to feel how the device works.

The quick connector device (300) allows the technician to clearly determine whether the device is in the locked or unlocked state based on the angular position, to thereby prevent the technician from skipping any step in handling the device.

In the locked state, the elastic member (321) of the locking member (320) is firmly supported to securely maintain the locked state. To repair the device, the locking member (320) is rotated to enter into the unlocked state so that the elastic member (321) deforms elastically and inwardly, and the locking member (320) and the connector body (310) can be easily disconnected from the injector port (400).

Although the following detained description contains many specifics for the purposes of illustration, those of ordinary skill in the art will appreciate that many variations and alterations to the following detains are within the scope of the invention.

What is claimed is:

1. A quick connector device comprising:
a connector body that has two fluid hose connectors located at two ends and an injector port connector located at a middle bottom section thereof;
a locking member that is inserted into and rotatably connected to the injector port connector of the connector body and detachably coupled to the injector port;
an o-ring that is coupled to the injector port connector of the connector body and provides a sealing to the injector port;
at least one elastic member that is located on outer side of the locking member and has cut-out ends;
a bump that engages into a bump receiving space formed on the inner surface of the injector port and is disposed on outer side of the elastic member;
a receiving space that is formed on an upper outer surface of the injector port connector of the connector body and allows the elastic member to elastically deform therein; and
a support rib that is disposed on one side of the receiving space and prevents the elastic member from moving when the locking member is in a locked state; and
one or more catch ribs that are disposed on upper sides of the injector port connector of the connector body along a horizontal direction,
wherein the locking member includes a handle that is disposed on an upper side of the locking member and forms an integral portion of the locking member and wherein the handle includes rib receiving grooves formed on upper middle sides and upper middle front and back portions thereof and wherein the one or more catch ribs correspond to the rib receiving grooves.

2. A quick connector device, comprising:
a connector body that has two fluid hose connectors located at two ends and an injector port connector located at a middle bottom section thereof;
a locking member that is inserted into and rotatably connected to the injector port connector of the connector body and detachably coupled to the injector port;
an o-ring that is coupled to the injector port connector of the connector body and provides a sealing to the injector port;
at least one elastic member that is located on outer side of the locking member and has cut-out ends;
a bump that engages into a bump receiving space formed on the inner surface of the injector port and is disposed on outer side of the elastic member;
a receiving space that is formed on an upper outer surface of the injector port connector of the connector body and allows the elastic member to elastically deform therein; and
a support rib that is disposed on one side of the receiving space and prevents the elastic member from moving when the locking member is in a locked state;
wherein the locking member includes a handle that is disposed on an upper side of the locking member and forms an integral portion of the locking member and
wherein the locking member has second bump receiving spaces that are disposed along a vertical direction at front and back sides of the locking member and disposed on an inner surface of the locking member and wherein the injector port connector of the connector body includes second bumps that are disposed on left, right, front and back sides of the injector port connector and disposed on an upper outer surface of the injector port connector and correspond to the second bump receiving spaces.

\* \* \* \* \*